United States Patent [19]

Warner et al.

[11] 3,944,001
[45] Mar. 16, 1976

[54] HYDRAULIC FOLDING MECHANISM FOR DISCS AND THE LIKE

[75] Inventors: William Warner, Tustin; Dale Gordon, Santa Ana, both of Calif.

[73] Assignee: Towner Manufacturing Company, Santa Ana, Calif.

[22] Filed: Sept. 16, 1974

[21] Appl. No.: 506,395

[52] U.S. Cl. .................. 172/311; 172/456; 172/501
[51] Int. Cl.² ..................... A01B 63/32; A01B 63/22
[58] Field of Search ........... 172/311, 126, 456, 481, 172/491, 501, 503, 568, 581, 613, 619, 620, 629, 635, 662, 663, 664, 666, 667, 668; 74/99 R; 16/163, 164; 280/166, 411 R, 473; 403/85, 95, 102

[56] References Cited
UNITED STATES PATENTS

| | | | |
|---|---|---|---|
| 3,650,333 | 3/1972 | Fueslein | 172/311 |
| 3,670,823 | 6/1972 | Mathews et al. | 172/130 X |
| 3,797,580 | 3/1974 | Roth | 172/311 |
| 3,828,860 | 8/1974 | Poland | 172/311 |
| 3,841,412 | 10/1974 | Sosalla | 172/311 |

FOREIGN PATENTS OR APPLICATIONS

| | | | |
|---|---|---|---|
| 745,918 | 3/1956 | United Kingdom | 280/166 |

*Primary Examiner*—Richard C. Pinkham
*Assistant Examiner*—Richard T. Stouffer
*Attorney, Agent, or Firm*—Harvey C. Nienow

[57] ABSTRACT

A hydraulically operated folding mechanism for ground working implements wherein substantially rectilinear movement of the piston rod of a hydraulic actuator causes one section of the implement to rotate substantially 180° relative to another section thereof. This enables a relatively large implement to be made small and compact for purposes of storage and transport. It further includes members for permitting the several sections to pivot relative to each other when in operating position so that the implement can conform to the contour of the ground and locking structure which prevents such pivotal movement as soon as the folding mechanism becomes operative.

8 Claims, 9 Drawing Figures

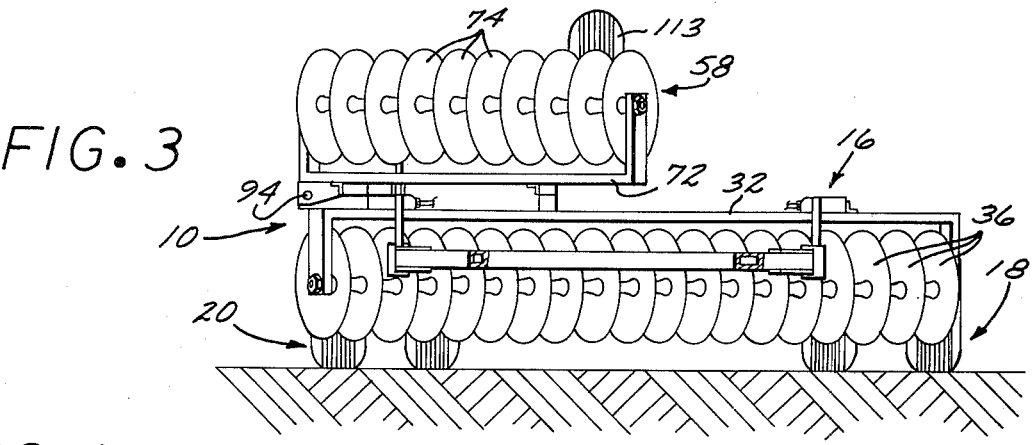
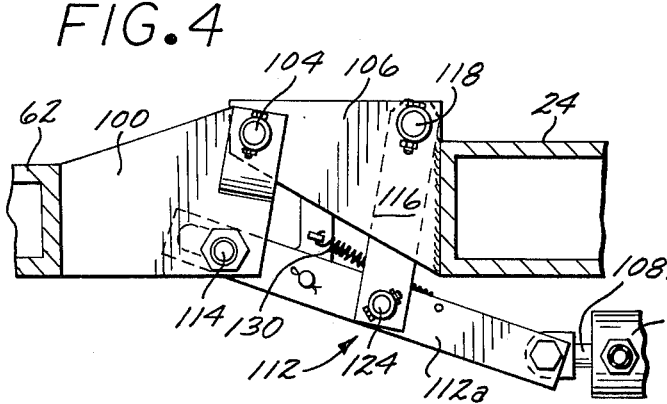
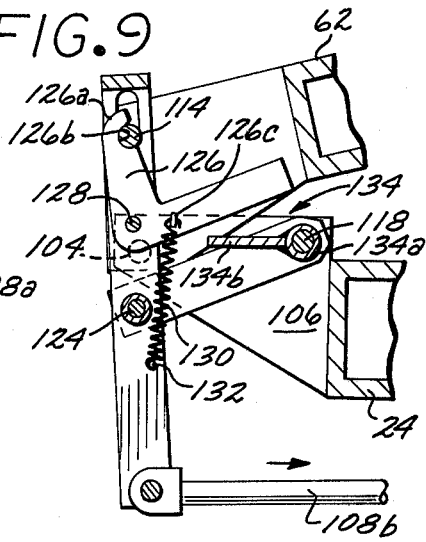
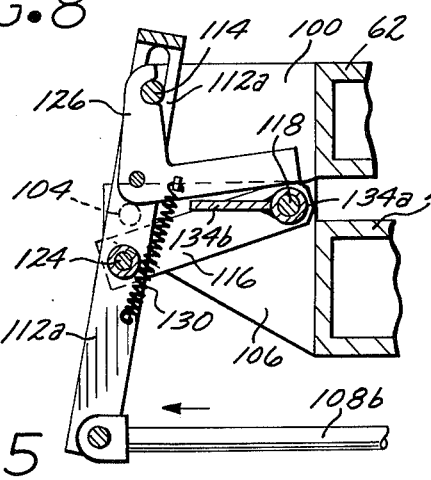
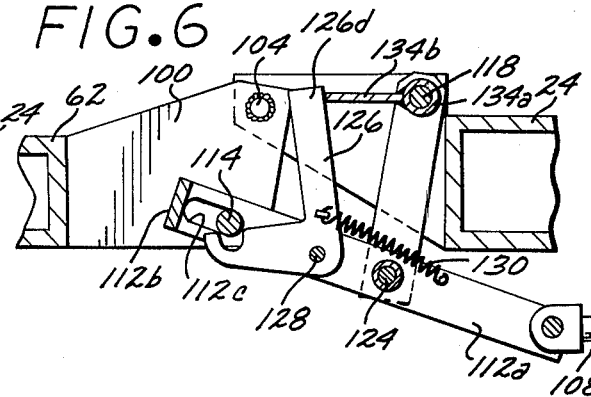
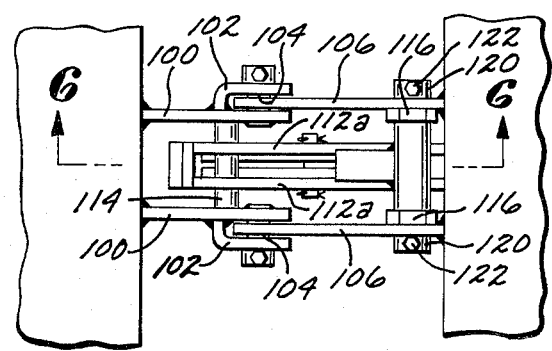
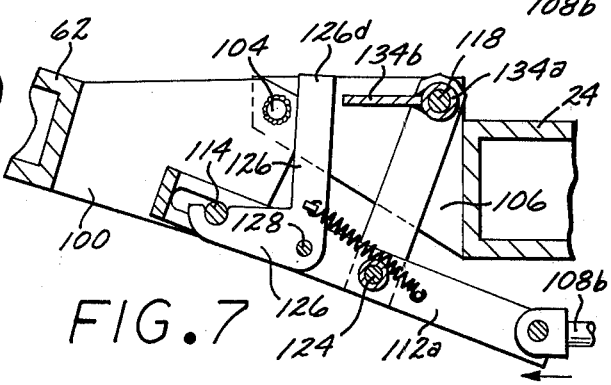

HYDRAULIC FOLDING MECHANISM FOR DISCS AND THE LIKE

The present invention relates generally to ground working implements to be attached to and moved by suitable motive power means, and more particularly to folding mechanisms for enabling one section of such implement to be automatically placed on top of another.

Whereas, fifty or seventy years ago, farming within the United States was performed by many individual farmers on relatively small plots of ground, today, farming is a relatively large business with large corporations managing and working very large parcels of land. As such, ground working implements are much larger today, due to the need for working large areas of ground within a short period of time. Also, the advent of powerful motive power means such as tractors and the like has enabled large implements to be employed.

Whereas many years ago the typical source of power might have been a team of horses or mules, today tractors are extremely powerful and capable of pulling relatively large ground working implements. This transition, however, has resulted in various problems for the farmer.

Since such ground working implements are now relatively large, it has become difficult to transport or store them in relatively narrow spaces. This problem is particularly accute with respect to transporting such implements along normal highways intended for ordinary vehicular traffic.

Due to the relatively large acreages which are used today in farming, a given implement must frequently be transported from one parcel of land to another, it being uneconomical to allow a given piece of equipment to be idle for long periods of time, particularly when other parcels of land are in need of such equipment.

Accordingly, it has been realized for some period of time, that it would be desirable to have a mechanism whereby a given ground working implement could be made small and compact so as to be permitted on normal vehicular highways. Although attempts have heretofore been made to provide such a mechanism, they have been cumbersome, and not easy to operate.

It is an object of the present invention to provide a folding mechanism for ground working implements which is capable of folding one section of the implement onto another section thereof, so as to make the resulting implement relatively small and compact.

Another object of the present invention is to provide a folding mechanism as characterized above which enables the several sections of the implement to freely "float" with respect to each other in normal operating position so as to conform to the irregularities or contours in the land or ground being worked.

A further object of the present invention is to provide a folding mechanism as characterized above, wherein locking means is imployed for overcoming the free floating characteristic so that the several sections are always under control during movement from and to the operating position.

An even further object of the present invention is to provide a folding mechanism as characterized above wherein substantially rectilinear movement of the piston rod of a hydraulic actuator causes one implement section to pivot substantially 180° onto another section thereof.

Another further object of the present invention is to provide a folding mechanism as characterized above which is simple and inexpensive to manufacture, and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 3 is a front plan view showing the disc in its folded or compact position;

FIG. 4 is a fragmentary sectional view taken substantially along line 4—4 of FIG. 1;

FIG. 5 is a fragmentary top plan view of a portion of the folding mechanism;

FIG. 6 is a fragmentary sectional view taken substantially along line 6—6 of FIG. 5, showing the folding mechanism near the beginning of the folding operation;

FIG. 7 is a fragmentary sectional view of the folding mechanism in another position during folding operation;

FIG. 8 is a fragmentary sectional view of the folding mechanism, the implement sections being folded together; and FIG. 9 is a fragmentary sectional view of the folding mechanism near the beginning of the retraction or unfolding operation.

Like reference characters indicate corresponding parts throughout the several views of the drawing.

Figure 1:
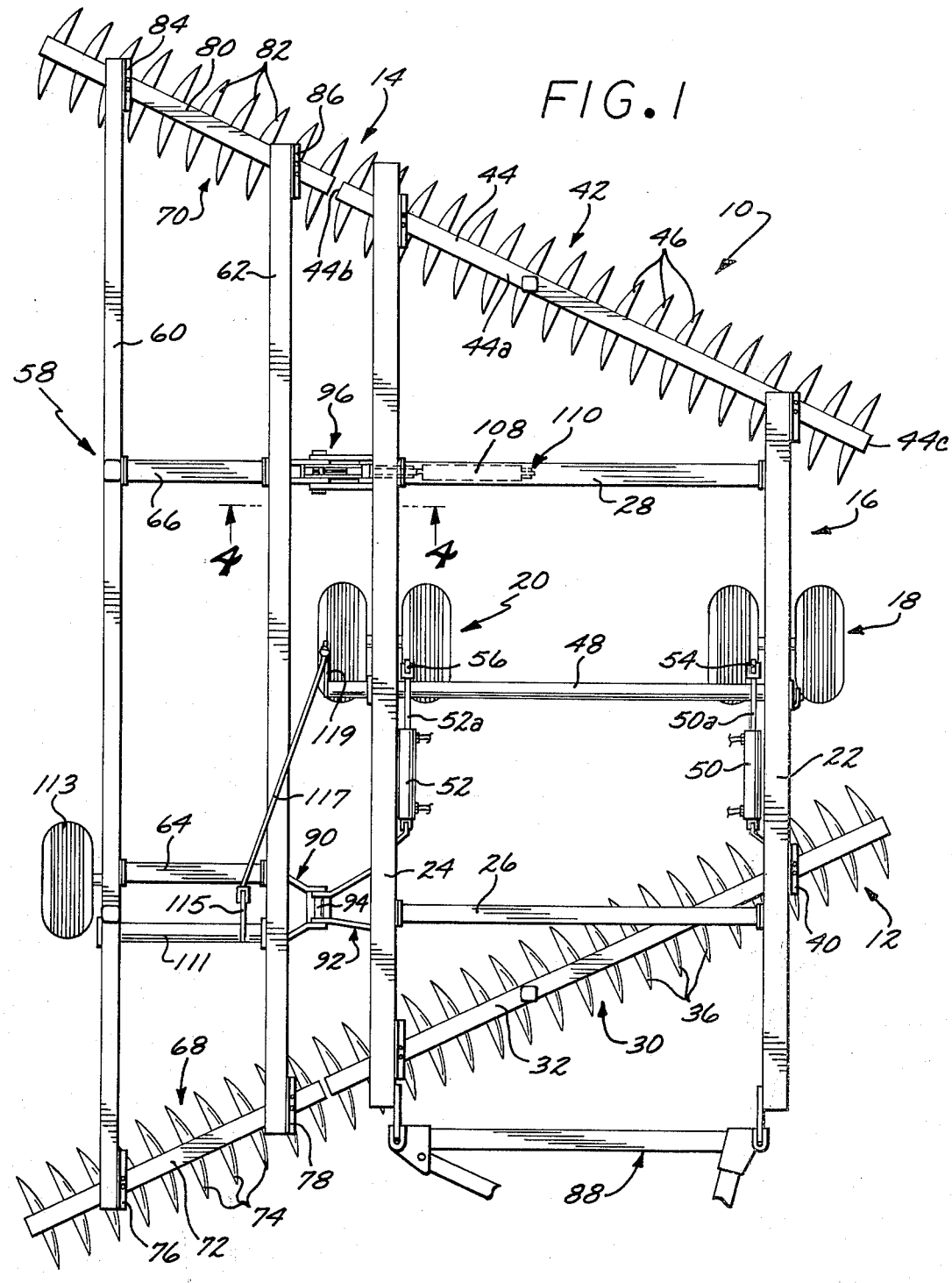
FIG. 1 is a top plan view of a disc provided with a folding mechanism according to the present invention.

Referring to FIG. 1 of the drawings, there is shown therein a disc 10 having a forward disc unit 12 and a rearward disc unit 14 to be pulled through the ground by suitable motive power means, not shown in the drawings. Such disc comprises a main disc 16 having a frame carried by a first set of wheels 18 and a second set of wheels 20. Such frame comprises a pair of channel frame members 22 and 24 in spaced relation as shown in FIG. 1, and a pair of cross members 26 and 28, each of which is firmly secured to the frame members 22 and 24 as shown. Thus, there is provided a strong frame structure.

The forward disc unit 12 includes a main forward disc section 30 as part of the main disc 16. Disc section 30 includes a generally U-shaped frame member 32 having a central portion 32a and a pair of depending side portions 32b and 32c. Such frame member 32 is formed of any appropriate structural material having the required cross-sectional configuration. A shaft 34 extends between the depending side portions 32b and 32c, and carries a plurality of spaced disc members 36 as shown in the drawings.

The disc section 30 is secured to the structural members 22 and 24 in depending fashion as by means of brackets 38 and 40.

In like fashion, there is provided at the rearward end of main disc 16, disc unit 42 which comprises a generally U-shaped frame 44 having a central portion 44a and side portions 44b and 44c. A shaft (now shown) extends between such side portions and carries the main rearward disc members 46.

The wheel sets 18 and 20 are attached to and carried by a rotatable shaft 48 which is suitably journaled relative to the frame members 22 and 24 so as to be rotatable about its longitudinal axis. A pair of hydraulic actuators 50 and 52 are mounted on the frame members 22 and 24, respectively, and have their piston rods 50a and 52a connected respectively to arms 54 and 56 extending from shaft 48. By suitable control of the hydraulic actuators 50 and 52, the shaft 48 can be made to rotate, thereby varying the distance between the wheel sets 18 and 20 and the frame of the main disc 16. In this manner, the depth of cut of the disc members 36 and 46 can be varied as desired.

Connected to the frame of main disc 16 is an auxiliary disc 58 having frame members 60 and 62 as well as cross members 64 and 66, the latter being firmly secured to the frame members 62 and 64 to provide a strong, rigid frame.

As above described with respect to the main disc 16, the auxiliary disc 58 comprises a forward disc section 68 and a rearward disc section 70. The forward section 68 comprises a generally U-shaped frame 72 to be aligned with the frame member 32 of the main disc section 30, and which carries a plurality of disc members 74. Such disc unit 68 is secured to the frame members 60 and 62 in depending fashion by brackets 76 and 78.

The rearward disc section 70 also comprises a general U-shaped frame 80 which carries a plurality of disc members 82 and is secured to the frame members 60 and 62 by brackets 84 and 86.

Connected to the forward end of the main disc 16 is a hitch 88 whereby the main section is secured to suitable motive power means such as a tractor which is capable of pulling the entire disc 10 through the ground to be worked.

With the auxiliary disc 58 connected to the main disc 16, the entire disc 10 becomes relatively wide so as to be capable of working a considerable amount of ground in a single pass or trip of the disc. This, of course, of beneficial, but such a wide unit might have difficulty conforming to the variations or contours encountered in the ground surface. To prevent this, the auxiliary disc 58 is pivotally connected to the main disc 16.

Suitable brackets 90 and 92 are secured respectively to the auxiliary disc 58 and to the main disc 16. A pivot pin 94 extends through the several brackets to complete the forward pivotal connection between the several disc units. The rearward pivotal connection 96 includes means for enabling the auxiliary disc unit 58 to be pivotally moved onto the main disc 16, as shown most clearly in FIG. 3 of the drawings and as will hereinafter be explained in detail.

Referring to FIG. 4 of the drawings, the pivotal means 96 comprises a pair of plates 100 firmly secured to the frame member 62 by any appropriate means as by welding, brazing, soldering, or the like, to extend therefrom in spaced relation as shown most clearly in FIG. 5 of the drawings. To provide a pair of spaced supports for two pivot pins, an L-shaped bracket 102 is firmly welded to each of the plates 100. Suitable aligned openings are formed in said plates and extensions to receive pivot pins 104 which are secured to the respective plate and carry a collar and fastening bolt on the outside of the respective bracket 102.

A pair of spaced pivot plates 106 are welded to the frame member 24 of main disc 16 to extend therefrom and between the respective pair of brackets 102 and plates 100 as shown in FIG. 5. Each plate 106 is provided with a through opening to receive the respective pivot pin 104 whereby the auxiliary disc 58 and main disc 16 are afforded pivotal movement relative to each other.

To enable the main and auxiliary discs to be adjusted as a unit in providing the desired depth of cut of the various disc units, a rotatable shaft 111 is mounted between the frame members 60 and 62 of the auxiliary disc 58 to carry an adjustment wheel 113. A lever arm 115 extends from said shaft 111, and is connected by means of an extension 117 to a similar lever arm 119 on rotatable shaft 48. Suitable universal joints are used to connect extension 117 to the several lever arms 115 and 119 to enable the disc 10 to be rendered compact as will hereinafter be explained in detail. Suffice, to realize that as hydraulic actuators 50 and 52 are operated to adjust the vertical position of wheel sets 18 and 20 relative to the main disc members, similar adjustment is simultaneously made through lever arm 119, extension 117, lever arm 115 and shaft 111 of the vertical position of wheel 113 relative to the disc members of the auxiliary disc 58.

A hydraulic actuator 108 having a hydraulic cylinder 108a one end of which is firmly secured to the cross member 28 of the frame of main disc 16, is provided as shown in FIG. 1 of the drawings. A piston rod 108b of actuator 108 extends from the cylinder 108a and is pivotally connected to a generally U-shaped lever 112 having a pair of lever arms 112a and an intermediate portion 112b.

A pivot pin 114 is firmly anchored to the spaced plates 100, by being welded thereto within suitable openings formed therein. As shown in FIG. 5 of the drawings, such pin 114 spans the space between the plates 100, and the lever arms 112a are formed with a pair of openings or slots 112c which receive the pin 114.

Thus, as the hydraulic actuator 108 is caused to extend its piston rod 108b, the auxiliary disc 58 is caused to pivot about pin 104 on main disc 16 by virtue of lever arms 112a exerting a force in the counter-clockwise direction, as viewed in FIG. 4.

To enable the hydraulic actuator 108 to have a mechanical advantage in so moving the auxiliary disc 58 and to enable such actuator to have substantially rectilinear movement, a pair of lever arms 116 are pivotally mounted relative to plates 106 and lever arms 112a. As shown in FIG. 5 of the drawings, the spaced plates 106 are provided with aligned through openings for receiving a pivot pin 118. Suitable mounting collars 120 and fastening bolts 112 therefore, are provided to maintain such pin 118 within the plates 106.

The lever arms 112a are also formed with aligned through openings to receive a pivot pin 124 which is also adapted with collars and bolts at its opposite ends as shown. The several lever arms 116 are individually provided with pivot holes at opposite ends for rotatably engaging the pivot pins 118 and 124. Thus, as the lever 112 responds to extension of the hydraulic actuator 108 in pivoting the auxiliary disc 58 onto the main disc 16, the several lever arms 116 pivot about pin 118 and, as will hereinafter be explained in greater detail, thereby vary the mechanical advantage of actuator 108 in so moving the auxiliary disc.

It will be noted that the several disc 58 and 16 are primarily connected together by means of the pivotal connections afforded by pins 94 and 104. By virtue of the slot 112c formed in each of the lever arms 112a, the auxiliary disc 58 is free to float relative to main disc 16. That is, as the entire disc 10 encounters irregularities in the ground surface, the auxiliary disc is free to move relative to the main unit, the pivot pin 114 thereby moving within the slots 112c while the forward portion of the discs pivot on pin 94.

When it is desired to fold the disc unit into its transport or storage condition, as shown in FIG. 3, it is merely necessary to operate hydraulic actuator 108 to the piston rod 108b thereof to be extended. However, to prevent undesired relative movement between the auxiliary and main discs 58 and 16 by virtue of slots 112c and pin 114, a locking mechanism is provided in the form of an L-shaped lock member 126 which is pivotally mounted between the lever arms 112a on a pivot pin 128. Such pin is firmly anchored in the lever arms 112a.

One end 126a of locking member 126 is formed with a semi-circular cutout or groove 126b for engaging the pivot pin 114 as will hereinafter become more apparent. A tab 126c on locking member 126 holds one end of a tension spring 130, the opposite end of such spring being anchored to and between the several lever arms 112a by a pin 132. Thus, throughout the pivotal movement of auxiliary disc 58 on pin 104, the locking member 126 engages pin 114 to prevent the auxiliary disc from falling over center as would result from movement of pin 114 within slots 112c.

To disengage locking member 126 from pin 114 when the several disc units are aligned in their operating positions, an extension 134 is provided on pivot pin 118. As shown in FIGS. 6, 7, 8, and 9 of the drawings, such extension comprises a sleeve 134a mounted on pin 118 and an extension member 134b welded thereto. Such extension member 134b is positioned between the plates 106 to be engaged by the locking member 126 as will hereinafter appear.

FIGS. 4, 5, and 6 of the drawings show the disc 10 in its operating condition with the auxiliary disc 58 generally aligned with the main disc 16. As shown most clearly in FIG. 6, at this time, the end portion 126d of locking member 126 engages the extension member 134b so that notwithstanding the effect of tension spring 130, the end portion 126a of locking member 126 is disengaged from pin 114. As such, the auxiliary disc 58 is free to pivot on pin 104 relative to main disc 16, the pin 114 thereby moving back and forth in the slots 112c of the lever arms 112a.

When it is desired to move auxiliary disc 58 to its transport position as shown in FIG. 3, it is merely necessary to operate hydraulic actuator 108 so as to extend piston rod 108b thereof. As shown in FIG. 7 of the drawings, the U-shaped lever 112 is moved toward the auxiliary disc 58 such that the locking member is near the pivot pin 114. Further operation of actuator 108 causes auxiliary disc 58 to pivot about pin 104, and lever 116 to pivot about pin 118. This causes locking member 126 to be disengaged from extension member 134b, enabling tension spring 130 to pivot locking member 126 so as to engage pin 114. Thereafter, the pin 114 is held in fixed position relative to lever 112.

As shown in FIG. 8, the pivotal movement of auxiliary disc 58 continues as hydraulic actuator 108 is extended. As the lever arms 116 approach the position shown in FIG. 8, the lever arm 112 pivots to a greater extent about pin 124. Thus, although the piston rod 108b tends to extend along a generally rectilinear path, the fulcrum about which lever 112 operates in pivoting auxiliary disc 58 on pin 104 becomes more predominantly pin 124. Such transition is continual until lever arms 116 reach their position as shown most clearly in FIG. 8 of the drawings. At this time, auxiliary disc 58 is in its storage or transport position, on top of main disc 16.

It will be noted that throughout such movement of auxiliary disc 58, locking member 126 retains pin 114 in the semi-circular groove 126b.

Figure 2:
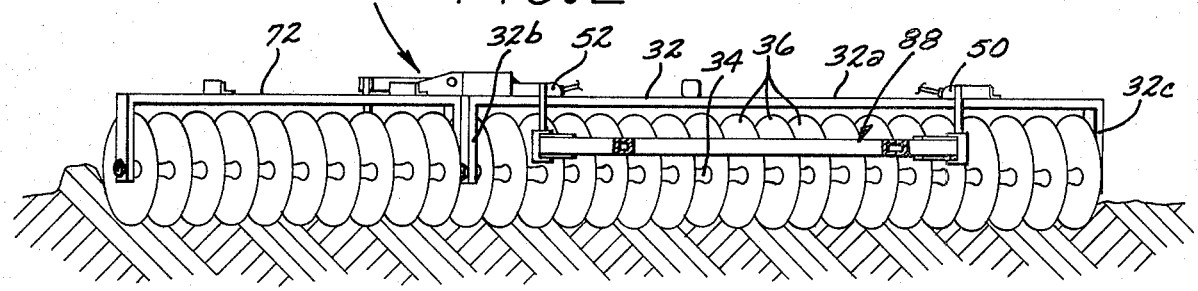
FIG. 2 is a front elevational view of the disc of FIG. 1.

When it is desired to return the auxiliary disc to its operating position shown in FIGS. 1 and 2 of the drawings, it is merely necessary to retract the piston rod 108b causing the reverse pivotal movement of all of the levers. Throughout this movement the fulcrum for lever 112 is decreasingly dependent upon pin 124. Also, as the folding mechanism returns to the position shown in FIGS. 4 and 6, the locking member 126 engages extension member 134b so as to release pin 114 to enable auxiliary disc 58 to again float relative to main disc 16.

It is thus seen that the present invention provides a folding mechanism for a ground working implement which enables the implement to be made compact for storage and transport reasons.

I claim:

1. A ground working implement having first and second sections and a folding mechanism therefor comprising in combination,
    means affording a pivotal connection between said first and second sections of the implement,
    a source of power carried by said first implement section,
    a lever directly connected to said source on one end thereof and to said second section on the other end thereof to respond to said source to rotate said second section about said first section at said pivotal connection from a first position to a second position,
    and means for varying the mechanical advantage of said source in pivoting said second section about said first section during movement thereof from said first position to said second position comprising an arm rotatably connected to said first implement section and to said lever.

2. A ground working implement having first and second sections and a folding mechanism therefor according to claim 1 wherein said means for varying the mechanical advantage comprises said arm rotatably connected to said first implement section and to said lever intermediate the latter's connection to said source and to said first section.

3. A ground working implement having first and second sections and a folding mechanism therefor according to claim 2 wherein the rotatable connection between said arm and said first implement section is spaced from said pivotal connection between said implement sections.

4. A ground working implement having first and second sections and a folding mechanism therefor according to claim 3 wherein said arm has spaced rotational connections one of which is rotatably connected to said first implement section at a point thereon removed from said pivotal connection and the other of which is rotatably connected to said lever intermediate the latter's connection to said source and said second implement section.

5. A ground working implement having first and second sections and a folding mechanism therefor comprising in combination,
   means affording a pivotal connection between said first and second sections of the implement,
   a source of power carried by said first implement section,
   a lever interconnecting said source and said second section to respond to said source to rotate said second section about said first section at said pivotal connection,
   lost motion means comprising a pin and slot connection between said lever and said second section to permit relative movement of said sections independent of said source of power,
   and locking means for locking out said lost motion means during rotation of said second implement section about said first implement section by said power source comprising a locking member movably mounted on carried by said lever and means for moving said member relative to said lever into a position whereby said member locks the pin and slot of said pin and slot connection in fixed relation relative to one another during said rotation.

6. A ground working implement having first and second sections and a folding mechanism therefor according to claim 5 wherein said moving means includes biasing means operatively connected to said locking member urging the same into locking position and automatic means for overcoming said biasing means to permit operation of said lost motion means whenever said implement sections are in pre-determined relation.

7. A ground working implement having first and second sections and a folding mechanism therefor according to claim 6,
   wherein said locking member is pivotally mounted on said lever, and said automatic means comprises an abutment member on said first implement section which interferes with said locking member to overcome said biasing means when, but only when, said implement sections are in predetermined relation.

8. A ground working implement having first and second sections and a folding mechanism therefor according to claim 7,
   wherein said locking member is an L-shaped lever arm having a portion formed to retain said pin in a predetermined position in said slot but only when said second abutment member is inoperative.

* * * * *